(12) United States Patent
O'Grady, Jr. et al.

(10) Patent No.: US 6,665,650 B1
(45) Date of Patent: *Dec. 16, 2003

(54) INTELLIGENT LOGIC ACTIVITY RESOLUTION

(75) Inventors: William T. O'Grady, Jr., Austin, TX (US); Pierre Gauthier, Cupertino, CA (US); Donald F. Shafer, Austin, TX (US); John D. McNeill, Austin, TX (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 327 days.

(21) Appl. No.: 09/594,367

(22) Filed: Jun. 15, 2000

(51) Int. Cl.[7] ............................................. G06F 15/18
(52) U.S. Cl. ............................ 706/12; 706/14; 706/903
(58) Field of Search ............................. 706/12, 14, 903

(56) References Cited

U.S. PATENT DOCUMENTS 5,851,309 A * 12/1998 Kousa ........................ 126/578

OTHER PUBLICATIONS

Paul E. Rybski, Heterogeneous Mobile Robotic Platforms Exhibiting Emergent Behavior through a Parallel, Sensory–Defined, Event–Driven Architecture, 1995, Lawrence University, 1–41.*

* cited by examiner

Primary Examiner—Anil Khatri
Assistant Examiner—Joseph Hirl

(57) ABSTRACT

Intelligent logic activity resolution (ILAR) is provided for a process. Upon a first trigger event being received, a first subset of conditions of the process is detected. The first subset of conditions is selected based on the first trigger event. When the first subset of conditions match predetermined values, a first state is entered. When the first subset conditions do not match the predetermined values, additional conditions are checked. On the basis of the checked additional conditions, a new state is selected for entry.

9 Claims, 5 Drawing Sheets

INTELLIGENT LOGIC ACTIVITY RESOLUTION

A computer program listing appendix is submitted on compact disk and is hereby incorporated by reference. A total of two compact discs are submitted as part of the computer program listing appendix. Each compact disc contains an identical copy of the file 10992699.doc, created on Nov. 6, 2002 and containing 104,222 bytes.

BACKGROUND

The present invention concerns automated process control and pertains particularly to use of intelligent logic activity resolution within an automated process control system.

Current methods of automated manufacturing process control are limited by the use of static connected state transition models to impose a predefined behavioral expectation on the process.

In a standard state transition model, each state can only transition to a limited number of other states based on fixed transition events. For example, a manufacturing process in a first state can only transition to a second state upon the occurrence of a first transition event or into a third state upon the occurrence of a second transition event. All other states and transition events are considered invalid. Under this static state transition process model, if, while in the first state, a third transition event occurs, the model will not be able to determine a next valid state. Instead, the system would, for example, issue an alarm and halt the manufacturing process.

An additional limitation to automated manufacturing process control systems that function in accordance with a standard state transition model is the static nature of the state model. There is no provision for the system to adapt itself to new states and transition events without significant manual intervention.

SUMMARY OF THE INVENTION

In accordance with the preferred embodiment of the present invention, intelligent logic activity resolution (ILAR) is provided for a process. Upon a first trigger event being received, a first subset of conditions of the process is detected. The first subset of conditions is selected based on the first trigger event. When the first subset of conditions match predetermined values, a first state is entered. When the first subset conditions do not match the predetermined values, additional conditions are checked. On the basis of the checked additional conditions, a new state is selected for entry.

In the preferred embodiment, the detection of the first subset of conditions is done by running a separate metaprocedure to detect each condition in the first subset of conditions. A metaprocedure is a software function that performs an automated check for a condition. A metaprocedure can also perform non-state change related functions such as sending messages to external systems, or storing and retrieving data variables relevant to the process. In the preferred embodiment, each condition is represented with a single metaprocedure.

In a preferred embodiment of the present invention, the subset of conditions are also selected based on a current state of the process.

Upon receiving a second trigger event, a second subset of conditions of the process are detected. The second subset of conditions are selected based on the second trigger event. When the second subset of conditions match predetermined values, a corresponding state is entered. When the second subset of conditions do not match the predetermined values, additional conditions are checked. On the basis of the checked additional conditions a new state is selected for entry.

The ILAR system described herein removes the constraints of the static connected state transition model. The ILAR system disconnects the state and transition event relationship and treats each state and transition event as a unique and independent occurrence. Using a dynamic, real time logic engine, rather than a static connected state model, the ILAR heuristically determines the next state based on an analysis of all detectable manufacturing process conditions rather than the transition event detected. With this method, all states and transitions are always valid, unless specifically declared invalid by the user. This is a significant advance over prior art state machines.

DESCRIPTION OF THE PRIOR ART

Figure 1:
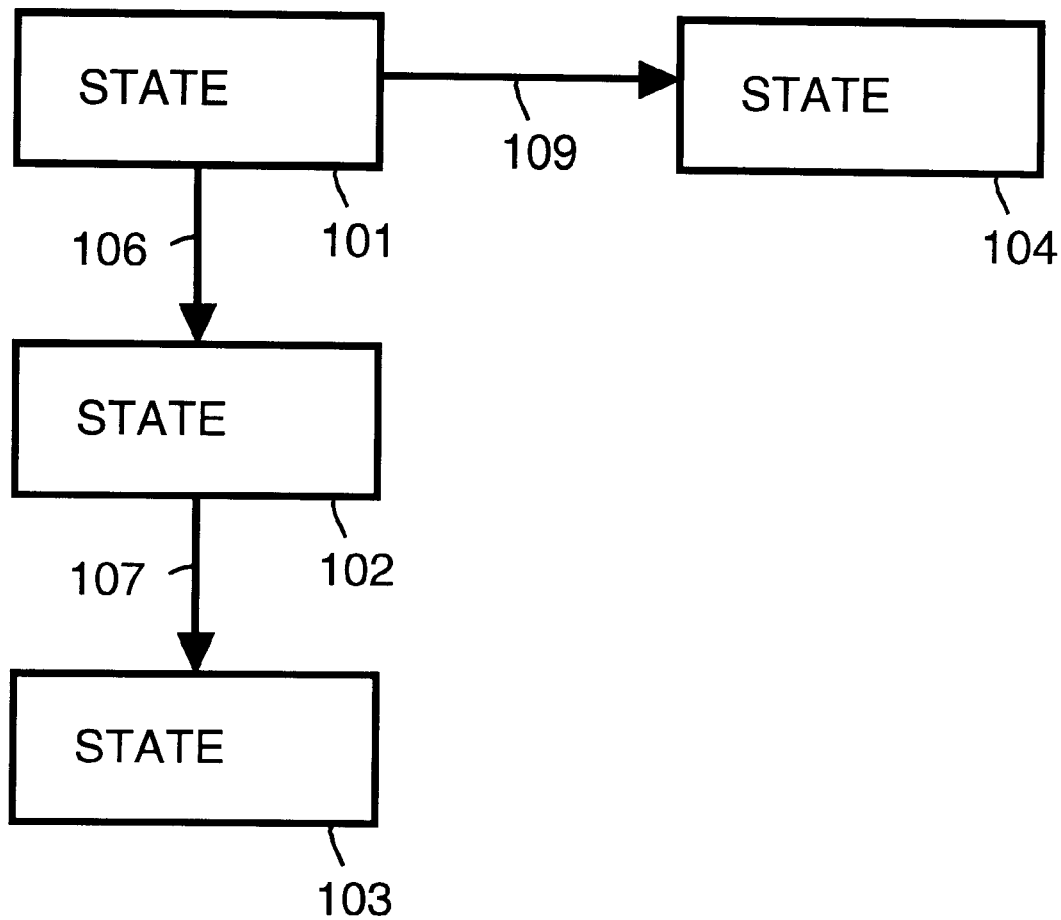
FIG. 1 illustrates operation of a standard state transition model in accordance with the prior art.

FIG. 1 illustrates operation of a standard state transition model in accordance with the prior art. In the shown standard state transition model, a manufacturing process currently in a state 101 can transition to a state 102 upon the occurrence of a transition event 106. When the manufacturing process currently is in state 101, the manufacturing process can also transition to a state 104 upon the occurrence of a transition event 109. When the manufacturing process currently is in state 102, the manufacturing process can transition to a state 103 upon the occurrence of a transition event 107. All other states and transition events are considered invalid. Under this static state transition process model, if, while in state 101, transition event 107 occurs, the model will not be able to determine a next valid state. Instead, the system would, for example, issue an alarm and halt the manufacturing process.

DESCRIPTION OF THE PREFERRED EMBODIMENT

Figure 2:
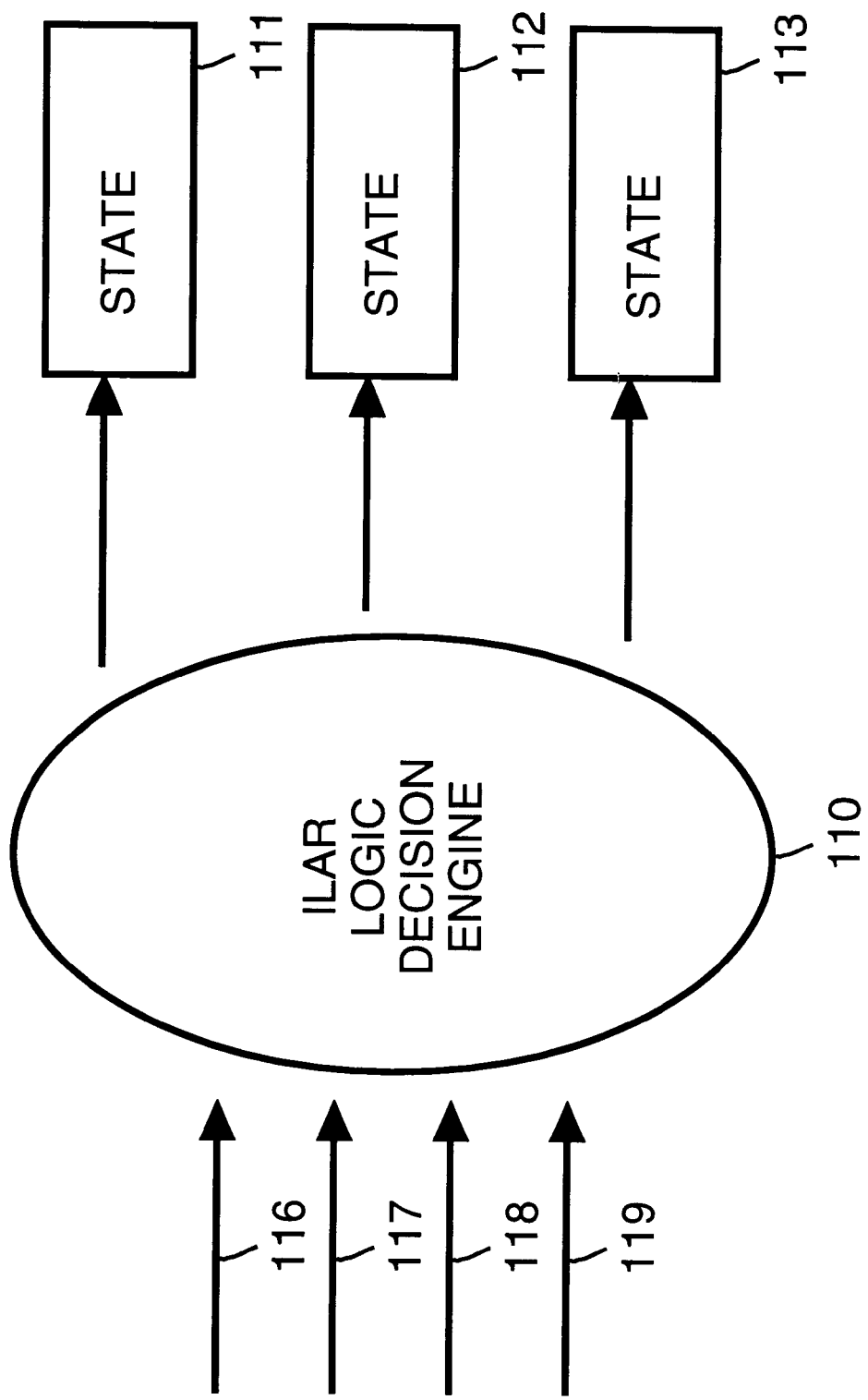
FIG. 2 illustrates intelligent logic activity resolution in accordance with the preferred embodiment of the present invention.

FIG. 2 illustrates intelligent logic activity resolution (ILAR) in accordance with the preferred embodiment of the present invention. The ILAR system described herein removes the constraints of the static connected state transition model. An ILAR system disconnects the state and transition event relationship and treats each state and transition event as a unique and independent occurrence. Using a dynamic, real time logic engine, rather than a static connected state model, the ILAR system heuristically determines the next state based on an analysis of all detectable manufacturing process conditions. This allows significant flexibility over the standard approach of basing state transitions just on a detected transition event.

In FIG. 2, an ILAR logic decision engine 110 is made up of one or more independent decision processes that query all possible process conditions to determine a process state. The query processes are, for example, linked in Boolean logic trees to allow decisions to be made based upon the process queries.

In the preferred embodiment of the present invention, all states and transitions are always valid, unless specifically declared invalid by the user that programs the ILAR system. If ILAR logic decision engine 110 detects an event specifically declared invalid, ILAR logic decision engine 110 will behave much like the static state model by issuing an alarm and halting the process. In the case of a transition event that causes a state that is not declared invalid and not previously detected, ILAR logic decision engine 110 will run a user defined set of default metaprocedures known as differentia in order to re-establish the correct process state. Using this method, ILAR logic decision engine 110 can detect and report in real time new manufacturing process conditions.

Thus, as illustrated by FIG. 2, a state 111, a state 112 and a state 113 are independent state locations, linked by a dynamically allocated event transition 116, a dynamically allocated event transition 117, a dynamically allocated event transition 118 and a dynamically allocated event transition 119. This organization allows ILAR logic decision engine 110 to be easily adaptable and modified to provide real time behavioral determination of process execution.

The organization shown in FIG. 2 allows transitions and states from different processes to be combined into higher order logic decision engines within ILAR logic decision engine 110. This allows ILAR logic decision engine 110 to be able to monitor and control a larger portion of the process. The dynamic nature of the manufacturing process is represented by the dynamic configuration capability of ILAR logic decision engine 110.

Additionally the organization shown in FIG. 2 allows each of the states and transitions to be assigned a time parameter. If the state or transition triggers the time parameter, ILAR logic decision engine 110 can execute without the need for a specific process transition. In this way, the lack of process activity can also be detected and monitored.

Figure 3:
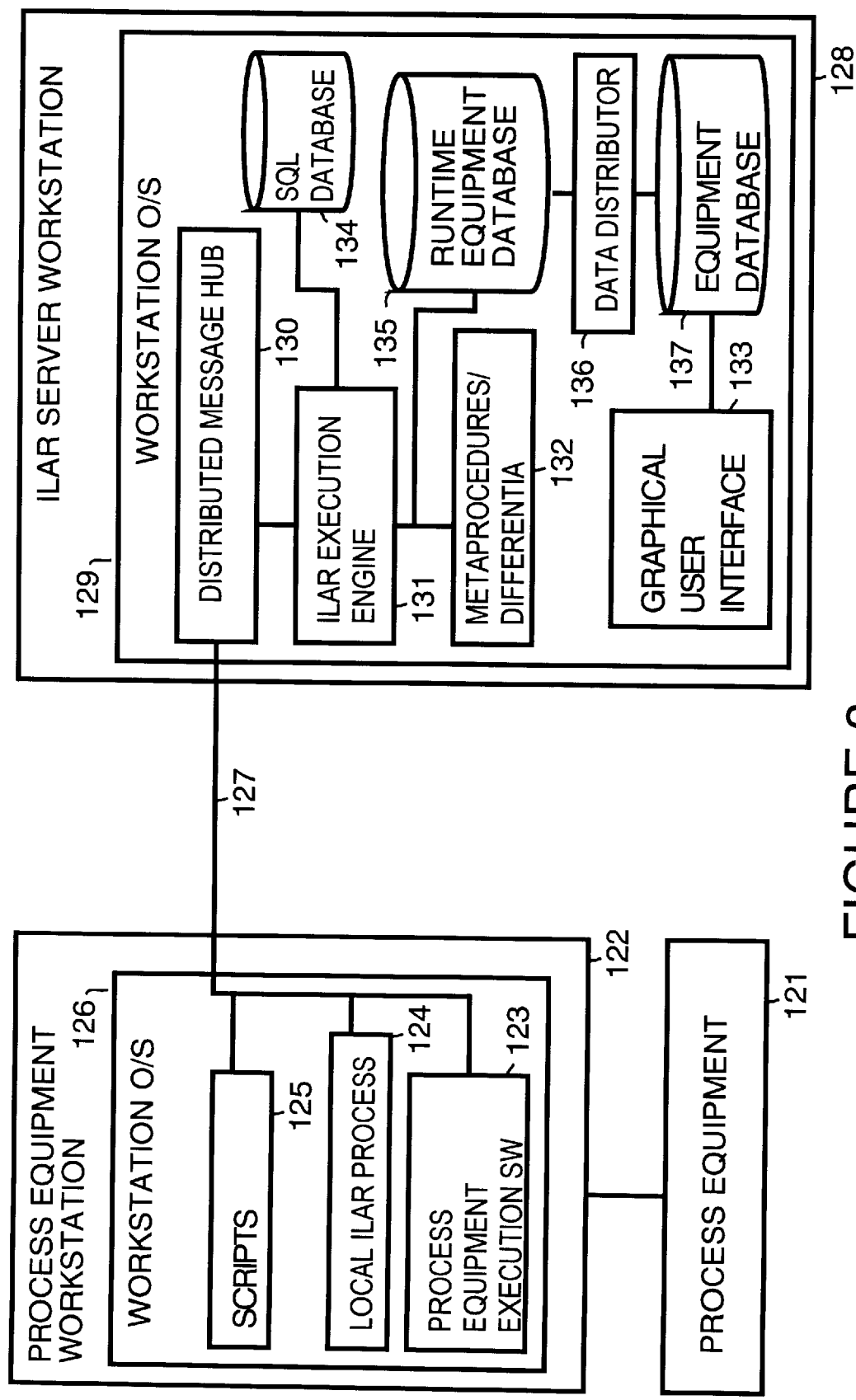
FIG. 3 is a simplified block diagram of an intelligent logic activity resolution system in accordance with the preferred embodiment of the present invention.

FIG. 3 is a simplified block diagram that shows a specific implementation of an intelligent logic activity resolution (ILAR) system within a manufacturing process.

As illustrated by FIG. 3, a process is made up of the operation of one or more pieces of equipment. In FIG. 3, this is represented by process equipment 121. Process equipment 121 may be, for example, an Agilent 83000 test system available from Agilent Technologies, Inc. Alternatively, process equipment 121 may be a materials handler or any other type of processing equipment manageable by a workstation.

Process equipment 121 is managed by a process equipment workstation 122. Within process equipment workstation 122 a workstation operating system (O/S) 126 runs. Workstation operating system 126 is, for example, the UNIX operating system, Windows NT operating system, Linux operating system, or another available operating system.

The ILAR system uses scripts 125 on the local station to execute required conditional check functions. A local ILAR process 124 coordinates execution of scripts 125 in accordance with instructions from an ILAR server workstation 128. Local ILAR process 124 also coordinates the transfer of process trigger events to ILAR server workstation 128 via a connection 127. Connection 127 is implemented, for example as part of a TCP/IP network.

Within ILAR workstation 128 a workstation operating system (O/S) 129 runs. Workstation operating system 129 is, for example, the UNIX operating system, Windows NT operating system, Linux operating system, or another available operating system. FIG. 3 shows that within workstation O/S 129, various software processes run. These software processes along with local ILAR process 124 compose the ILAR system.

A distributed message hub 130 provides interprocess communication such as the process trigger events from process equipment workstation 126. Distributed message hub 130 is implemented, for example, using a Hume Integration Services Distributed Message Hub mailbox server, available from Hume Integration Services, having a business address of 35 Sundown Parkway, Austin, Tex. 78746. The Hume Distributed Message Hub is a high-level software facility providing interprocess communication for applications executing within a TCP/IP network.

Any source-connection process (equipment, driver, process, user, etc.) such as local ILAR process 124 or any other source-connection process existing on process equipment workstation 122 or other workstations used to control process equipment, request and present data from a particular external source via mailbox messages in the Hume mailbox (mbx) system within distributed message hub 130.

An ILAR execution engine 131 makes decisions about the current state of process equipment 121 and potentially other pieces of equipment. ILAR execution engine 131 takes action when the perceived state changes. The actions performed include the updating of the ILAR system's internal representation of the state of the processing equipment and may include the generation of messages to process equipment workstation 122, the requesting of information from a user and/or the display of messages to the user.

A user utilizes an ILAR graphical user interface 133 to specify within a database 137 process equipment types and process trigger events. From equipment database 136, a data distributor 136 prepares a runtime equipment database 135 utilized by ILAR execution engine 131 during runtime. The user also utilizes graphical user interface 133 to define and save process analysis metaprocedures and process state differentia, as represented in FIG. 3 by a block 132. The decision logic that the Execution Engine follows is user defined, and also resides in a SQL database 135. The decision logic is composed of logical units and the links between them. ILAR execution engine 131 stores run time process status variables and other run time information in SQL database 134.

Graphical user interface 133 is JAVA based and uses the Hume Data Hub tool to create and store centralized equipment database 137. In the preferred embodiment, ILAR execution engine 131 is written in tcl, using the Hume Data Hub mbx and database extensions. Each source-connection process may be written in whatever language is convenient to the communication method of the source and the requirement of writing to the Hume mbx system.

The total ILAR system takes advantage of the inherent logical structure of a process. As discussed above, a process is made up of the operation of one or more pieces of equipment. Each piece of equipment is defined by its type.

Over linear sequential time, a process moves through a series of states. For example, one state is loading material. Another state is testing material. A third state is calibration the process system. And so on.

Each process has one or more identifiable process conditions. For example, one process condition is that an operator is logged into the process system. Another process condition is that a test program is loaded. Another process condition is that a test program is running. Another process condition is that a materials handler is moving material into a chamber for processing. And so on.

Each state can be identified by a unique set of one or more process conditions. For example, in one set of processing conditions, the state "testing" can be identified when all the following conditions are true: an operator is logged into the process system, a test program is loaded and a test program is running.

Transitioning from one state to another is considered a process event. The occurrence of this process event is called a process trigger event. For example, a process trigger event occurs when material is loaded. A process trigger event occurs when a test has begun. A process trigger event occurs when a test has finished. A process trigger event occurs when material has been unloaded. And so on.

The transition from one state to another is detected by monitoring the process trigger events.

In order to implement and execute an ILAR system, the user defines five different types of process information. The five different types of process information are: (1) equipment types; (2) equipment states; (3) process trigger events; (4) metaprocedures; and, (5) differentia.

A metaprocedure is a software function that performs an automated check for a condition. Each condition is represented with a single metaprocedure.

What is meant by differentia is a defined process condition set that indicates a process state. Each differentia represents a unique set of process conditions that define a unique process state.

Using ILAR graphical user interface 133, the user associates the five process information components to define a specific instance of a process execution. ILAR works by implementing the generated process logic.

Figure 4:
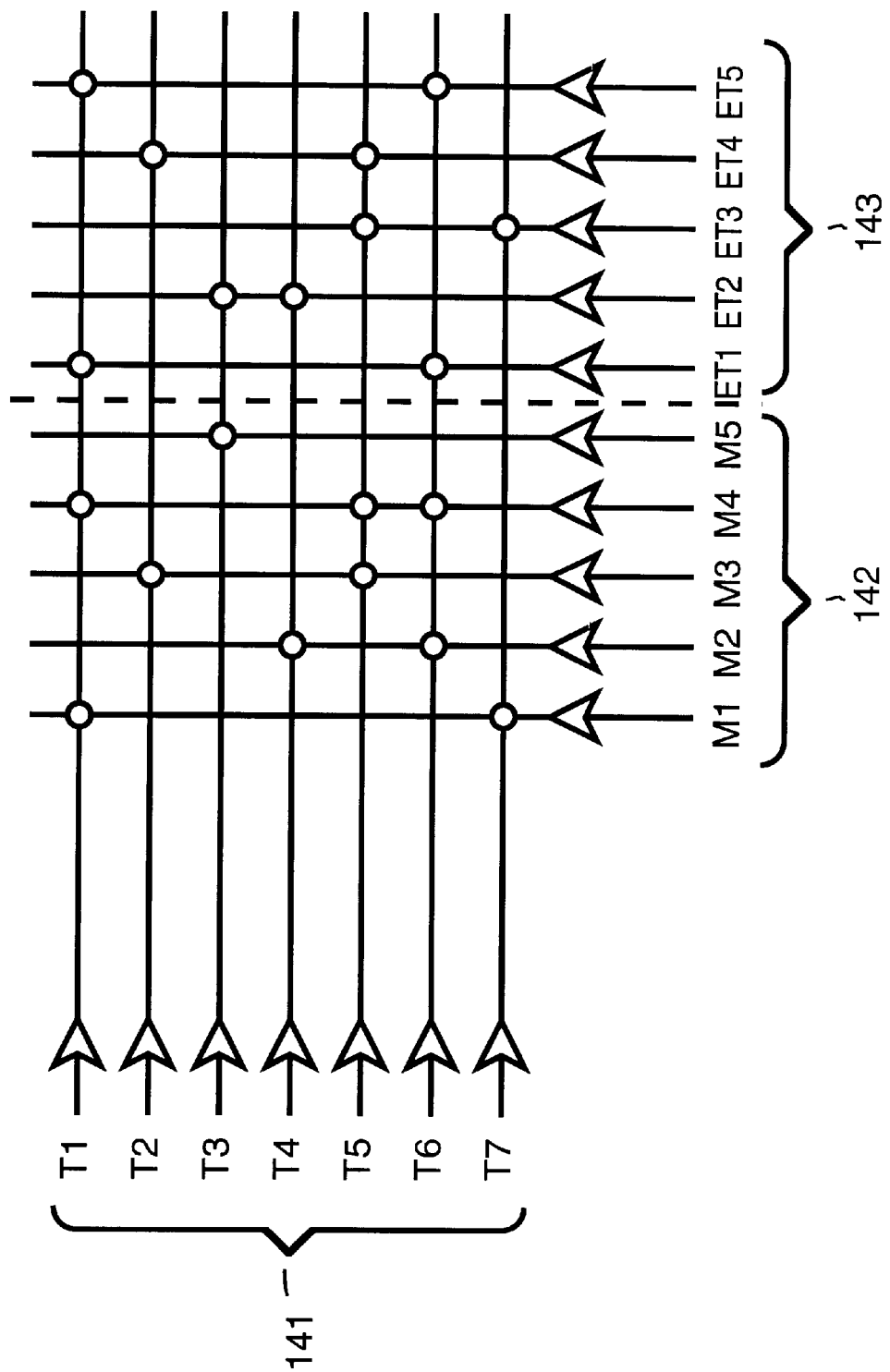
FIG. 4 illustrates logic relationship between trigger events, metaprocedures and elapsed timers in accordance with the preferred embodiment of the present invention.

FIG. 4 illustrates logic relationship between trigger events, metaprocedures and elapsed timers as programmed by a user. Seven trigger events 141 are shown: an trigger event T1, an trigger event T2, an trigger event T3, an trigger event T4, an trigger event T5, an trigger event T6 and an trigger event T7. Five process condition metaprocedures 142 are shown: a metaprocedure M1, a metaprocedure M2, a metaprocedure M3, a metaprocedure M4 and a metaprocedure M5. Five process event elapsed timers 143 are shown: an elapsed timer ET1, an elapsed timer ET2, an elapsed timer ET3, an elapsed timer ET4 and an elapsed timer ET5.

Table 1 below describes process execution logic for the logic relationships shown in FIG. 4. The ILAR system can provide a unique process execution logic relationship and table for each state the process can be in.

TABLE 1

| Trigger event | Run MP | Start Timers | P.S. on Pass | MP fails; | Timer Expires |
|---|---|---|---|---|---|
| T1 | M1, M4 | ET1, ET5 | A | Run all MPs | Run all MPs |
| T2 | M3 | ET4 | B | Run MPs M1, M4, M5 | Run all MPs |
| T3 | M5 | ET2 | C | Run all MPs | Send Trigger T2 |
| T4 | M2 | ET2 | D | Run MPs M3, M5 | Run all MPs |

TABLE 1-continued

| Trigger event | Run MP | Start Timers | P.S. on Pass | MP fails; | Timer Expires |
|---|---|---|---|---|---|
| T5 | M3, M4 | ET3, ET4 | E | Run all MPs | Send Trigger T7 |
| T6 | M2, M4 | ET1, ET5 | F | Run MPs M1, M3 | Run all MPs |
| T7 | M1 | ET3 | G | Run all MPs | Run all MPs |

In table 1, the first column sets out the trigger events. The second column shows which metaprocedures (MPs) are run for each trigger event set out in the first column. The third column shows which timers are started for each trigger event set out in the first column. The fourth column shows which process state (P.S.) is set if the metaprocedures set out in the second column pass when they are run as a result of the trigger event set out in the first column. The fifth column shows which metaprocedures are run e.g., all the metaprocedures) when the metaprocedures set out in the second column do not pass when they are run as a result of the trigger event set out in the first column. The sixth column shows which metaprocedures are run (i.e., all the metaprocedures) when the timers set out in the third column expire after being started as a result of the trigger event set out in the first column. The expiration of a timer can also result in the generation of a new trigger to the input of ILAR execution engine 131.

When, as a result of a metaprocedure failure or the expiration of a timer, all the metaprocedures are run, the state is set as a result of which metaprocedures pass. Table 2 below shows which state is set depending upon which metaprocedure(s) pass(es).

TABLE 2

| M1 | M2 | M3 | M4 | M5 | Set State |
|---|---|---|---|---|---|
| Pass | | | Pass | | A |
| | | Pass | | | B |
| | | | | Pass | C |
| | Pass | | | | D |
| | | Pass | Pass | | E |
| | Pass | | Pass | | F |
| Pass | | | | | G |

Figure 5:
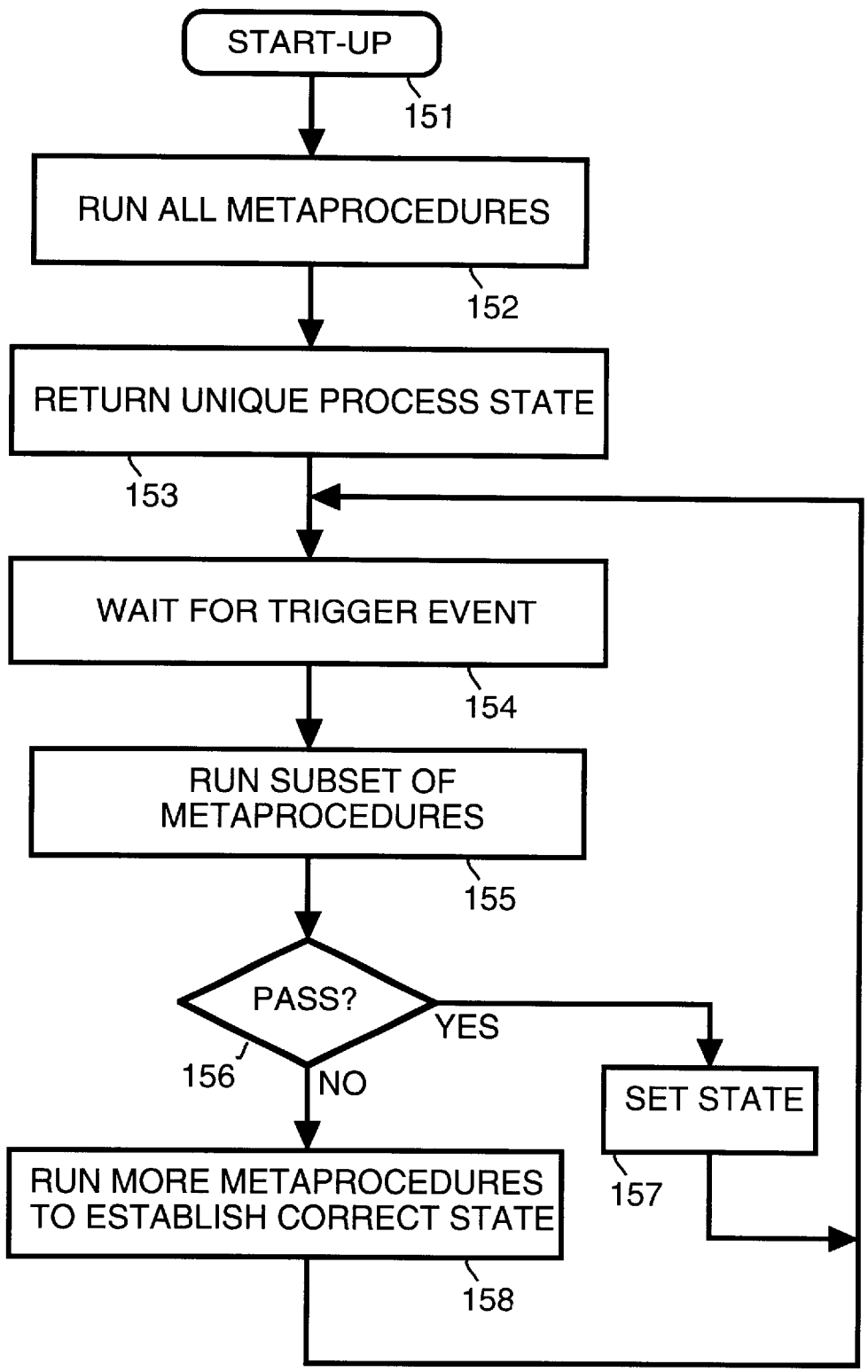
FIG. 5 is a flowchart that describes operation of an intelligent logic activity resolution system in accordance with the preferred embodiment of the present invention.

FIG. 5 is a flowchart that describes operation of the ILAR system. In a step 151 the ILAR system starts up. In a step 152, all metaprocedures are run in order to query the process for all possible conditions. As discussed above, a metaprocedure is a software function that performs an automated check for a condition. Each condition is represented with a single metaprocedure.

In a step 153, ILAR execution engine 131 compares the resulting map of conditions that return logical true and logical false results against all of the defined process condition sets. These condition sets are known in the ILAR system as differentia. As discussed above, each differentia represents a unique set of process conditions that define a unique process state. ILAR execution engine 131 returns as a result, the unique process state it has identified.

In a step 154, the ILAR system now waits for a process trigger event. The absence of a trigger event over a user determined period of time could itself represent an internally generated trigger event (i.e., the expiration of a timer).

A step 155 is entered upon the occurrence of a trigger event. In this step, the ILAR system runs a subset of user defined metaprocedures to determine if the process is in the state that the user would expect based on the previous state and the trigger event.

In a step 156, a check is made to see if process is in the state that the user would expect based on the previous state and the trigger event (pass). If so, in a step 157, the correct state is set and in step 154, the next trigger event is awaited.

If in step 156, the ILAR check fails, i.e., in a step 158 the process is not in the expected state based on the previous state and trigger event, the ILAR begins to run more metaprocedures until it can once again establish a passing differentia and determine the correct state. Then, in step 154, the next trigger event is awaited.

Table 3 and Table 4 set out in the Computer Program Listing Appendix submitted on Compact Disk show two example metaprocedures used in a test installation.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A system comprising:
   an execution engine that makes decisions about a current state of a process; and,
   execution logic that is run by the execution engine, the execution logic comprising:
      a plurality of trigger events, each of the trigger events being associated with the following:
         at least one metaprocedure that is run in response to the trigger event, each metaprocedure of the at least one metaprocedure making a check for a process condition,
         at least one timer that is started in response to the trigger event,
         a process state that is entered upon all of the at least one metaprocedures passing in response to the at least one metaprocedure being run in response to the trigger event,
         a set of metaprocedures that is run when any of the at least one metaprocedure fails in response to the at least one metaprocedure being run in response to the trigger event, and
         an action to be taken when any of the at least one timer expires.

2. A system as in claim 1 wherein the action is one of the following:
   a set of metaprocedures that is run when any of the at least one timer expires;
   a trigger event.

3. A system as in claim 1, wherein the execution logic additionally comprises the following:
   specification of process states that are entered upon various combinations of metaprocedures passing upon the set of metaprocedures being run when any of the at least one metaprocedure fails in response to the at least one metaprocedure being run in response to the trigger event.

4. A method for determining process states for a process, the method comprising the following steps:

(a) preparing execution logic, including the following substep:
      setting out a plurality of trigger events, including the following substeps for each trigger event of the plurality of trigger events:
         providing at least one metaprocedure that is run in response to the trigger event, each metaprocedure of the at least one metaprocedure making a check for a process condition,
         providing at least one timer that is started in response to the trigger event,
         providing a process state that is entered upon all of the at least one metaprocedures passing in response to the at least one metaprocedure being run in response to the trigger event,
         providing a set of metaprocedures that is run when any of the at least one metaprocedure fails in response to the at least one metaprocedure being run in response to the trigger event, and
         providing an action to be taken when any of the at least one times expires; and, (b) using an execution engine to execute the execution logic.

5. A method as in claim 4, wherein the action is one of the following:
   a set of metaprocedures that is run when any of the at least one timers expires;
   a trigger event.

6. A method as in claim 4 wherein step (a) additionally comprises the following substep:
   specifying process states that are entered upon various combinations of metaprocedures passing upon the set of metaprocedures being run.

7. A system useful for resolving states of a process comprising:
   an execution engine that makes decisions about a current state of the process; independent of prior history of the process
   a plurality of metaprocedures, each metaprocedure making a check for a process condition; and, execution logic that is run by the execution engine, the execution logic comprising:
      a plurality of trigger events, each of the trigger events being associated with the following:
         at least one metaprocedure from the plurality of metaprocedures that is run in response to the trigger event, each metaprocedure of the at least one metaprocedure making a check for a process condition,
         a process state that is entered upon all of the at least one metaprocedures passing in response to the at least one metaprocedure being run in response to the trigger event,
         a set of metaprocedures that is run when any of the at least one metaprocedure fails in response to the at least one metaprocedure being run in response to the trigger event, and
         a specification of process states that are entered upon various combinations of metaprocedures passing upon the set of metaprocedures being run.

8. A method for determining process states for a process, the method comprising the following steps:

(a) running a plurality of metaprocedures to determine a current process state, each metaprocedure from the plurality of metaprocedures returning a value based on a check of a process condition; and, (b) upon occurrence of any trigger event from a plurality of defined trigger events, performing the following substeps:

running a subset of metaprocedures from the plurality of metaprocedures, when all the metaprocedures in the subset of the metaprocedures pass, setting the current process state to be a first value, the first value being based on all the metaprocedures in the subset of the metaprocedures passing, and when any of the metaprocedures in the subset of the metaprocedures fail, running the plurality of metaprocedures to determine the current process state.

9. A method as in claim 8 additionally comprising the following steps:

repeating step (b) for each trigger event that occurs.

\* \* \* \* \*